United States Patent [19]

Anderson

[11] Patent Number: 6,012,656

[45] Date of Patent: Jan. 11, 2000

[54] HIGH EFFICIENCY LIME/FERTILIZER SPINNER SPREADER MACHINE

[75] Inventor: Dean I. Anderson, Paynesville, Minn.

[73] Assignee: Ag-Chem Equipment Co., Inc., Minnetonka, Minn.

[21] Appl. No.: 09/061,310

[22] Filed: Apr. 16, 1998

[51] Int. Cl.⁷ .................................................. A01C 19/00
[52] U.S. Cl. ...................................... 239/672; 198/735.3
[58] Field of Search .................................... 239/672, 671, 239/681, 687; 198/735.3; 414/489

[56] References Cited

U.S. PATENT DOCUMENTS

| | | | |
|---|---|---|---|
| Re. 35,100 | 11/1995 | Monson et al. | 111/130 |
| 3,602,404 | 8/1971 | Frank | 222/252 |
| 3,631,825 | 1/1972 | Weiste | 111/11 |
| 3,705,455 | 12/1972 | Lovett | 29/234 |
| 3,774,709 | 11/1973 | Granberg | 180/53 |
| 3,780,955 | 12/1973 | Palmer | 239/672 |
| 3,889,883 | 6/1975 | Anderson | 239/679 |
| 4,106,643 | 8/1978 | McGehee | 214/83.36 |
| 4,205,792 | 6/1980 | Horst et al. | 239/679 |
| 4,282,968 | 8/1981 | Temme | 198/735.3 |
| 4,377,365 | 3/1983 | Layh | 414/334 |
| 4,630,773 | 12/1986 | Ortlip | 239/1 |
| 5,355,815 | 10/1994 | Monson | 111/200 |
| 5,453,924 | 9/1995 | Monson et al. | 364/131 |
| 5,501,403 | 3/1996 | van Vooren | 239/662 |

*Primary Examiner*—Andres Kashnikow
*Assistant Examiner*—Lisa Douglas
*Attorney, Agent, or Firm*—John F. Klos

[57] ABSTRACT

A spinner spreader machine has a product conveyor assembly that efficiently and accurately spreads either lime or fertilizer products, or combinations thereof. The versatility of the machine is enhanced with a plurality of conveyor belt assemblies configured to overcome the self-cohesive characteristics of certain products such as lime. The versatility of the machine is further enhanced when the conveyor apparatus provides a substantially constant volumetric distribution of product to the spinner mechanism.

18 Claims, 8 Drawing Sheets

HIGH EFFICIENCY LIME/FERTILIZER SPINNER SPREADER MACHINE

BACKGROUND OF THE INVENTION

The invention relates to spinner spreader machines. More particularly, the invention relates to a spinner spreader machine that selectively facilitates highly efficient application of lime and fertilizer products.

Spinner spreader machines are used to deliver fertilizer products over a desired geographic land area. Conventional spinner spreader apparatus such as the model L2020 manufactured by Highway Equipment Company of Cedar Rapids, Iowa, generally include a conveyor belt having a smooth surface to transport fertilizer and the like from a product storage bin to a spinner spreader mechanism at the rear of the spinner spreader machine. The smooth surface conveyor belts are generally driven via a set of rollers. The need for well-controlled lime product applications exists. For example, the coefficient of friction of lime to itself is higher than the coefficient of friction between lime and the smooth surface conveyor belts. Generally, as lime is transported from the product bin to the spinner spreader mechanism at the rear of the machine, the high coefficient of friction of lime to itself causes inconsistent delivery of the lime to the spinner spreader mechanism, causing inaccuracies in delivery and applications to a desired site. The use of smooth surface conveyor belt/rollers also is susceptible to slippage between the conveyor belt and the drive roller(s) creating even greater discrepancies between the desired and actual delivery and application of fertilizer and lime products. A model L3020 spinner spreader machine manufactured by Highway Equipment Company of Cedar Rapids, Iowa utilizes chains on the underside of the conveyor belt to move the conveyor belt.

All references cited herein, including the foregoing, are incorporated herein in their entireties for all purposes.

SUMMARY OF THE INVENTION

Accordingly, the present inventive spinner spreader machine advantageously overcomes many of the shortcomings and attendant disadvantages of known spinner spreader machines that share problems considered unavoidable within the industry. The present invention surmounts these problems with an advantageous new system that includes a novel product transport apparatus to enhance and optimize selective application of lime and fertilizer products. The system includes a Chevron® continuous conveyor belt available from West Central Bearing of Alexandria, Minn. which has a plurality of surface protrusions particularly suitable for collecting either lime or fertilizer in a consistent pattern and desired volumetric distribution over the surface of the conveyor belt. The conveyor belt and associated machinery is used to carry the product from the product storage bin(s) to the spinner spreader mechanism and advantageously provides consistent distribution of lime carried by the conveyor belt. As used herein, the term continuous conveyor belt means a conveyor belt joined at its ends to form a closed loop structure, thereby defining an inner surface and an outer surface. The conveyor belt has a drive chain coupled to each side edge in a manner to provide generally slip-free belt movement for accurate application of selected lime and fertilizer products. The variable gate control apparatus accuracy is optimized. The conveyor belt and drive chains are carried in a conveyor tray, preferably having side lips which prevent the product transporting section of the belt/chain apparatus from drooping such that highly detrimental product dumping is reduced or eliminated. The conveyor belt protrusions, associated drive chain apparatus and conveyor tray combine to create a spinner spreader machine that is suitable for selective application of either lime or fertilizer products.

Other features of the spinner spreader machine includes multiple spinners in combination with multiple conveyor belts, thereby allowing a greater variety of product application patterns or simultaneous application of lime and fertilizer products.

Yet another feature of the spinner spreader machine includes multiple conveyor belts thereby allowing simultaneous delivery of products stored in a plurality of different product storage bins attached to the same machine.

In sum, the invention relates to a spinner spreader machine which includes a vehicle, at least one product storage bin associated with or attached to the vehicle, at least one spinner spreader mechanism associated with or attached to a predetermined rear portion of the vehicle, and at least one conveyor belt assembly associated with or attached to the vehicle. The conveyor belt assembly includes a conveyor belt joined at its ends and defines an inner surface, an outer surface, a first side and a second side. The conveyor belt has a plurality of protrusions attached to predetermined portions of the outer surface. The conveyor belt has an upper portion used to transport product stored in the product storage bin and also has a lower return portion. A first chain sprocket has a predetermined pitch. A first drive chain is associated with or coupled to the first side of the conveyor belt. The drive chain is adapted to mesh with the first chain sprocket and continuously rotate the first chain sprocket and cause continuous movement of the conveyor belt. Product is transported from the storage bin to the spinner spreader mechanism. A conveyor tray is used to support the upper portion of the conveyor belt such that the upper portion of the conveyor belt remains substantially flat. The conveyor belt assembly may further include a second chain sprocket having the same predetermined pitch of the first chain sprocket. The conveyor belt assembly may further include a second drive chain coupled to the second side of the conveyor belt. The second drive chain is adapted to mesh with the second chain sprocket and continuously rotate the second chain sprocket and cause continuous movement of the conveyor belt and transport the product from the product storage bin to the spinner spreader mechanism. The conveyor belt assembly may further include at least one support roller selectively positioned against the conveyor belt inner surface to define the conveyor belt upper portion and the conveyor belt lower return portion. The conveyor belt assembly may further include at least one conveyor support member to support the lower return portion of the conveyor belt such that the lower return portion of the conveyor belt remains substantially flat. The spinner spreader machine may further include at least one variable speed drive apparatus selectively coupled to the first chain sprocket and the second chain sprocket to variably control a speed and direction of movement for the conveyor belt.

The invention also relates to a spinner spreader machine which includes a vehicle, at least one product storage device associated with or attached to the vehicle, at least one spinner spreader apparatus associated with or attached to the vehicle, and at least one conveyor assembly associated with or attached to the vehicle. The conveyor assembly includes at least one drive sprocket having a predetermined pitch, and a continuous conveyor belt having an outer surface and a plurality of protrusions attached to predetermined portions of the outer surface. The continuous conveyor belt meshes with the drive sprocket and continuous rotation of the drive sprocket causes continuous movement of the continuous conveyor belt and carries product stored in the product storage device to the spinner spreader apparatus. At least one rigid support member supports selected portions of the continuous conveyor belt as product is carried by the continuous conveyor belt is transported in a substantially flat plane. The continuous conveyor belt may further include an inner surface, a first side, a second side and a drive chain associated with or coupled to the first side of the continuous conveyor belt. The continuous conveyor belt meshes with the drive sprocket via the drive chain. The continuous conveyor belt may further include a drive chain coupled to the second side of the continuous conveyor belt such that the continuous conveyor belt meshes with the drive sprocket via the drive chain. The conveyor assembly may further include a roller selectively positioned against the continuous conveyor belt inner surface to define an upper portion and a lower return portion of the continuous conveyor belt. The spinner spreader machine may further include a variable speed drive apparatus selectively coupled to any one of the drive chains for variable control of speed and direction of the continuous conveyor belt.

The invention also relates to a spinner spreader apparatus which includes a vehicle having storage means for storing at least one product, at least one spinner apparatus associated with or attached to the vehicle, and at least one conveyor assembly associated with or attached to the vehicle. The conveyor assembly includes a continuous conveyor belt with an outer surface and with a plurality of protrusions attached to or formed on the outer surface, means for providing substantially slip-free motive force to the continuous conveyor belt such that product stored in the storage means is carried by the continuous conveyor belt to the at least one spinner apparatus. Supporting means provide support at selected portions of the continuous conveyor belt such that the product carried by the continuous conveyor belt has a substantially constant volumetric distribution over the outer surface. The means for providing substantially slip-free motive force to the continuous conveyor belt may include at least one drive sprocket having a predetermined pitch. The means for providing substantially slip-free motive force to the continuous conveyor belt may further include at least one drive chain coupled to the continuous conveyor belt. The drive chain mates with the drive sprocket. The continuous conveyor belt may further include an inner surface, a first side portion and a second side portion. The drive chain includes a first drive chain selectively coupled to at least one of the first side portion and the second side portion of the continuous conveyor belt and defines a first driven side portion and an opposite side portion of the continuous conveyor belt. The drive chain may further include a second drive chain selectively coupled to the opposite side portion of the continuous conveyor belt. The conveyor assembly may further include means for segregating the continuous conveyor belt into an upper product carrying portion and a lower return portion. The spinner spreader apparatus may further include at least one variable speed drive apparatus selectively coupled to any one of the drive chains to variably control speed and direction of the continuous conveyor belt.

The invention also relates to a spinner spreader machine which includes a vehicle, at least one product storage device associated with or attached to the vehicle, at least one spinner spreader apparatus associated with or attached to the vehicle, and a conveyor assembly associated with or attached to the vehicle. The conveyor assembly includes a plurality of drive sprockets with a common predetermined pitch, a plurality of continuous conveyor belts each configured with a smooth outer surface which mesh with the plurality of drive sprockets. Continuous rotation of the plurality of drive sprockets causes continuous movement of the conveyor belts which carry products stored in the product storage device to the spinner spreader apparatus. At least one support member is configured to support selected portions of the continuous conveyor belts such that products carried by the plurality of continuous conveyor belts are transported in a substantially flat plane to provide a substantially consistent distribution of products on the smooth outer surface of each conveyor belt. Each continuous conveyor belt within the plurality of continuous conveyor belts may include an inner surface, a first side, a second side and a drive chain coupled to the first side. Each continuous conveyor belt is configured to mesh with at least one of the drive sprockets via the drive chain. The conveyor assembly may further include at least one roller apparatus selectively positioned against the inner surface of each continuous conveyor belt to define an upper portion and a lower return portion for each continuous conveyor belt. The spinner spreader machine may further include at least one variable speed drive apparatus selectively coupled to the drive chains to variably control a speed and direction of each continuous conveyor belt.

From the foregoing, it is clear that the present inventive spinner spreader machine performance is advantageously enhanced. Other features of the present inventive apparatus include ease of use, manufacture, enhanced serviceability, maintainability, upgradability, and enhanced expansion and diagnostics capability.

Still other objects and advantages of the present invention and methods of construction and use of the same will become readily apparent to those skilled in the art from the following detailed description, wherein only the preferred embodiments are shown and described, simply by way of illustration of the best mode contemplated of carrying out the invention. As will be realized, the invention is capable of other and different embodiments and methods of construction and use, and its several details are capable of modification in various obvious respects, all without departing from the invention. Accordingly, the drawings and description are to be regarded as illustrative in nature, and not as restrictive.

DETAILED DESCRIPTION OF THE INVENTION

The preferred embodiments described address the long felt need by those in the lime and fertilizer product application industries to provide a highly efficient spinner spreader machine capable of handling a wide variety of lime or fertilizer applications where accuracy standards must be maintained. In accordance with the present invention, the preferred embodiments described readily and selectively apply either lime or fertilizer products, or combinations thereof.

Figure 1:
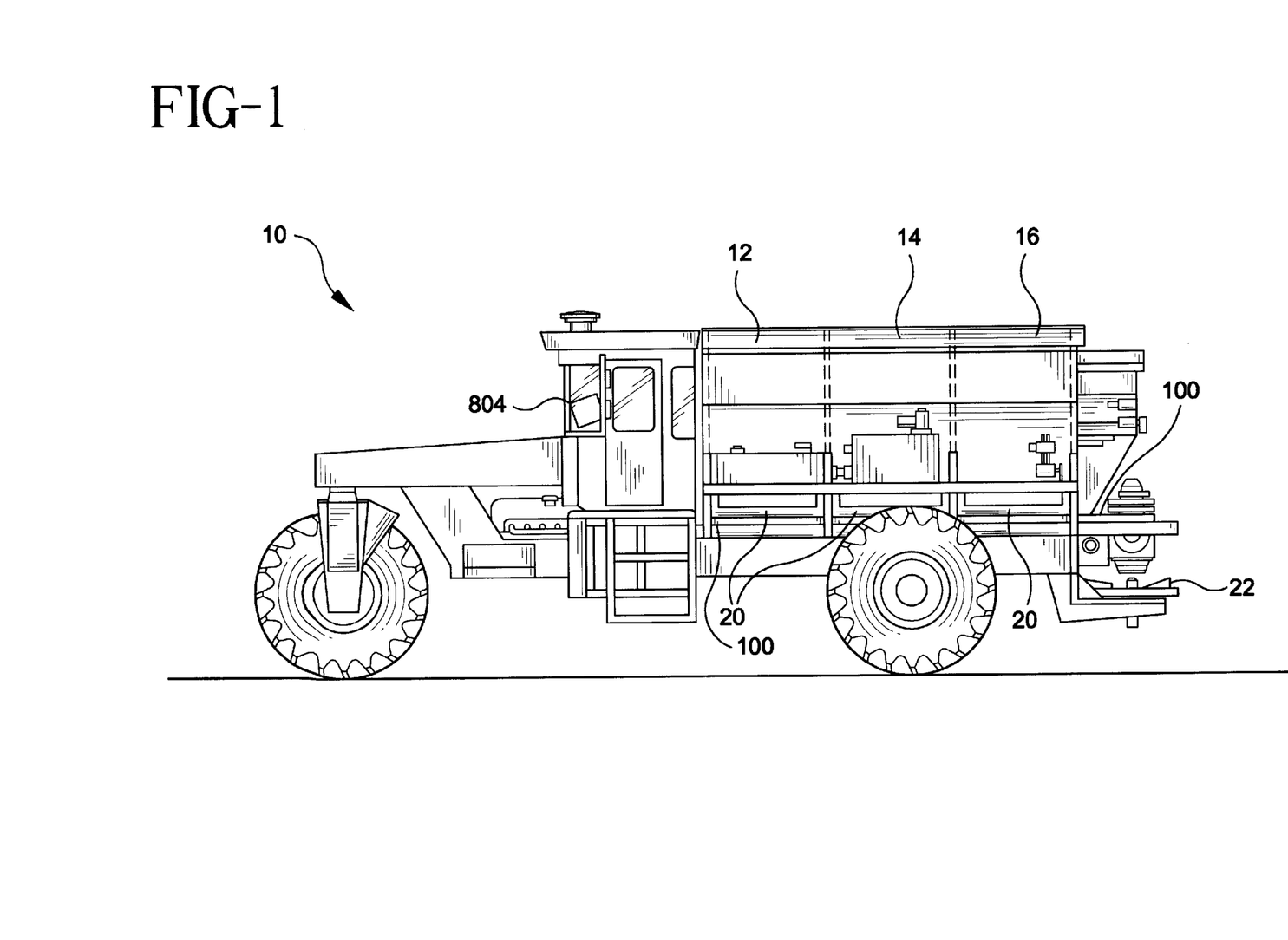
FIG. 1 illustrates a side view of a typical spinner spreader machine.

FIG. 1 illustrates a side view of a typical spinner spreader machine 10. Spinner spreader machine 10 includes a plurality of product storage bins 12, 14, 16 for selectively storing lime, fertilizer, or combinations thereof. The spinner spreader machines 10 also includes a conveyor system 20 for transporting the product(s) stored in bins 12, 14, 16 to a spinner apparatus 22. Typically, the spinner spreader machine 10 includes interconnecting devices (not shown) that allow the machine 10 to switch back and forth between desired bins 12, 14, 16 storing the same or different products such as lime and fertilizer.

Figure 2:
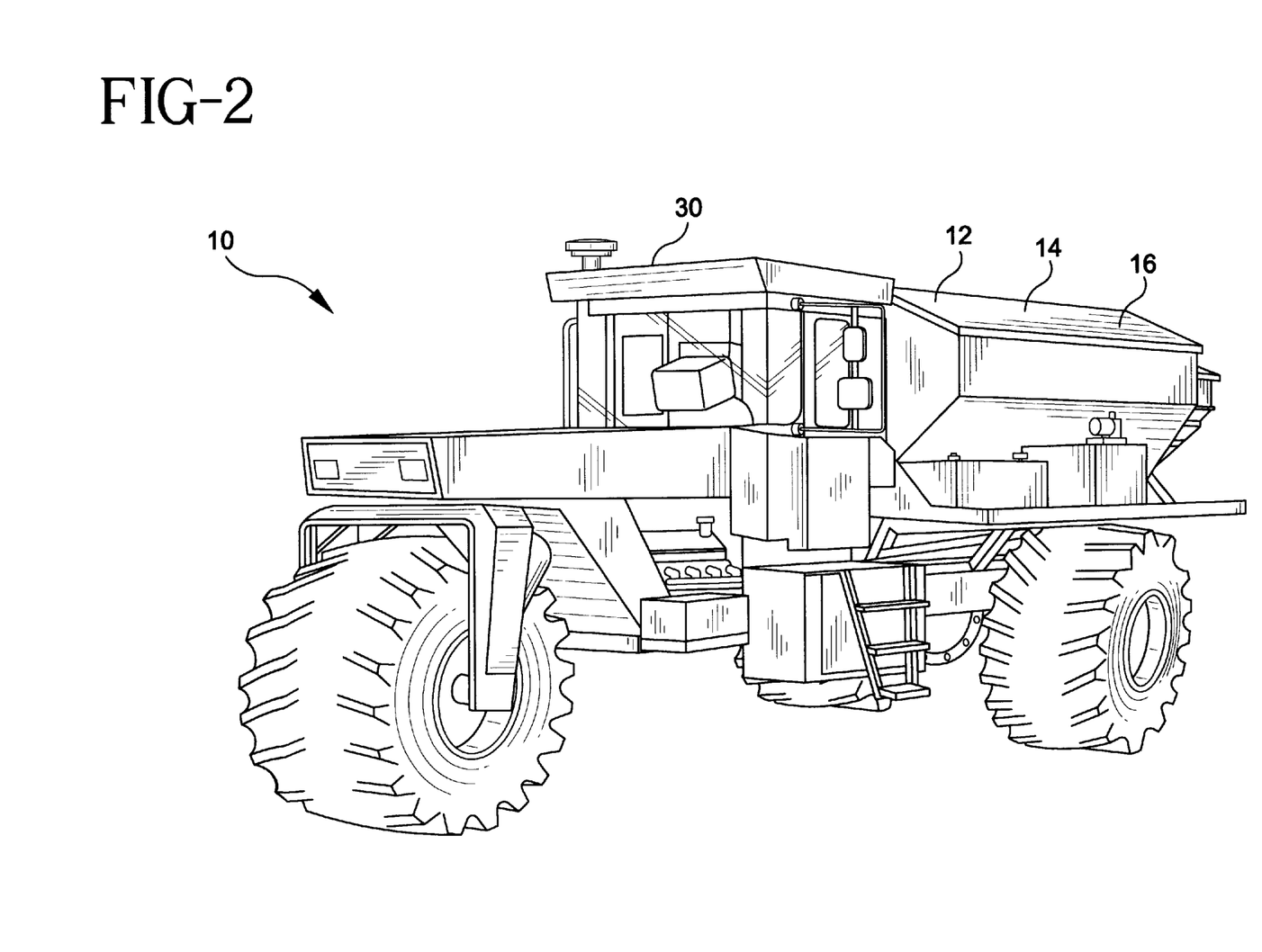
FIG. 2 illustrates a perspective view of the spinner spreader machine.

FIG. 2 illustrates a perspective view of the spinner spreader machine 10. Generally, spinner spreader machines are provided with a number of control mechanisms, e.g., conveyor speed, start, stop, gate opening height, storage bin discharge flow rate, and the like, in order to obtain a level of control of the product(s) being applied to a geographic site. While such machines are commercially available and are commonly used to apply fertilizer products, attempts to use these same machines to apply lime have proven to be generally inadequate to achieve the desired product dispensing rates and spreading patterns. The present invention overcomes the prior art limitations and providing a novel conveyor belt assembly.

Figure 3:
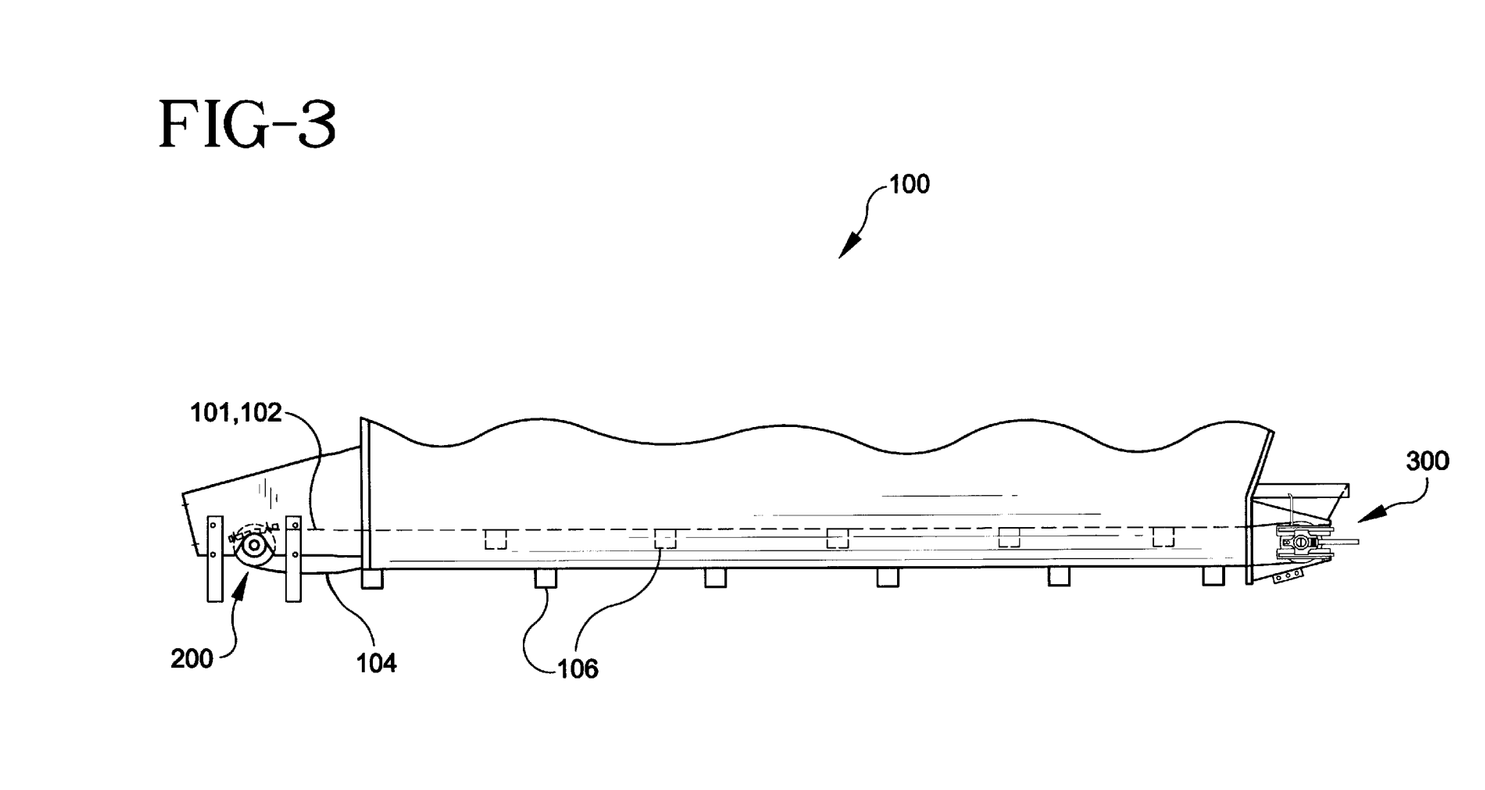
FIG. 3 illustrates a side view of a portion of the combination conveyor belt/drive chain apparatus in accordance with one preferred embodiment of the present invention.

Looking now at FIG. 3, a side view of a conveyor belt/drive chain assembly 100 is illustrated. Conveyor belt/drive chain assembly 100 can be adapted for installation on an existing spinner spreader machine or can be formulated as part of a dedicated machine such as a model HC-3000L spinner spreader machine designed specifically for lime and fertilizer applications and available from Lor*Al Products, Inc. of Benson, Minn. Conveyor belt/drive chain assembly 100 includes a rear chain drive apparatus 200 for variably controlling the direction of movement and speed of the conveyor belt/drive chain assembly 100 which is used to transport product(s) from the storage bins to the spinner apparatus at the rear of the machine. A frontally mounted chain sprocket assembly 300 is adapted to provide a desired amount of chain tension while freely allowing the rear chain drive apparatus 200 to power the conveyor belt/drive chain assembly 100. Most preferably, the rear chain drive apparatus 200 and the frontally mounted chain sprocket assembly include sprockets having identical pitch to mesh with the drive chain(s) 102 selected to provide motive force to the conveyor belt 101. Cross support members 106 provide structural support for an upper conveyor tray (enumerated as 402 in FIG. 6) and one or more lower conveyor belt return support guides (enumerated as 404 in FIG. 6) that are placed to support the conveyor belt 101 and its side mounted drive chains 102. With continued reference to FIG. 3, it can be seen that the conveyor belt 101 and drive chains 102 have a drooping portion 104 located between the conveyor belt/drive chain assembly 100 and the point at which the conveyor belt/drive chain assembly 100 enters the lower conveyor belt return support guide area. The top supported portion of the conveyor belt 101 does not have drooping portions due to the chain tension provided by the rear chain drive apparatus 200 and the enhanced structural support provided by the belt/chain 101, 102 and supporting structures 106, 402. These advantageous features combine to reduce undesirable product dumping effects associated with conventional spinner spreader machines. The present structure ensures that a substantially constant volumetric distribution of material is carried by the conveyor belt(s) 101 to the spinner mechanism(s) attached to the machine, due to the flat planar, non-slipping motion of the conveyor belt(s) 101.

Figure 4:
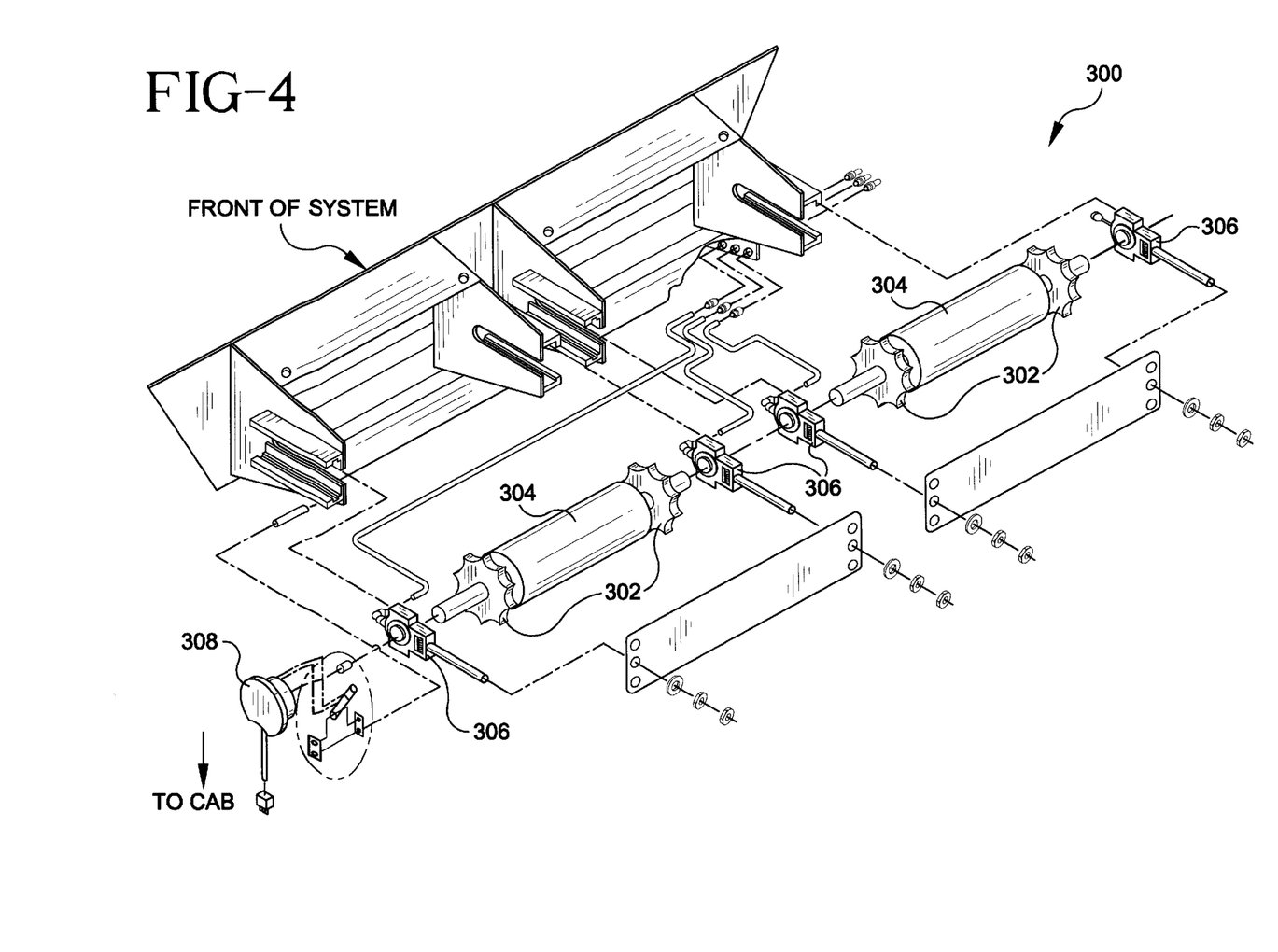
FIG. 4 illustrates a detailed view of a front portion section of the combination conveyor belt/drive chain apparatus shown in FIG. 3.

FIG. 4 illustrates a detailed view of a frontally mounted chain sprocket assembly 300 for the combination conveyor belt/drive chain apparatus 100 shown in FIG. 3. The chain sprocket assembly 300 includes a set of sprockets 302 and rollers 304 adapted to provide a desired tension and support for a pair of conveyor belts 101 and associated drive chains 102 attached at the outer edges of the belts 101. A set of motion control sensors 306 is electrically coupled into the operator cab of the spinner spreader machine via an interface connection 308 such that an operator can sense the direction and speed of the conveyor belt 101 and its associated drive chains 102.

Figure 5:
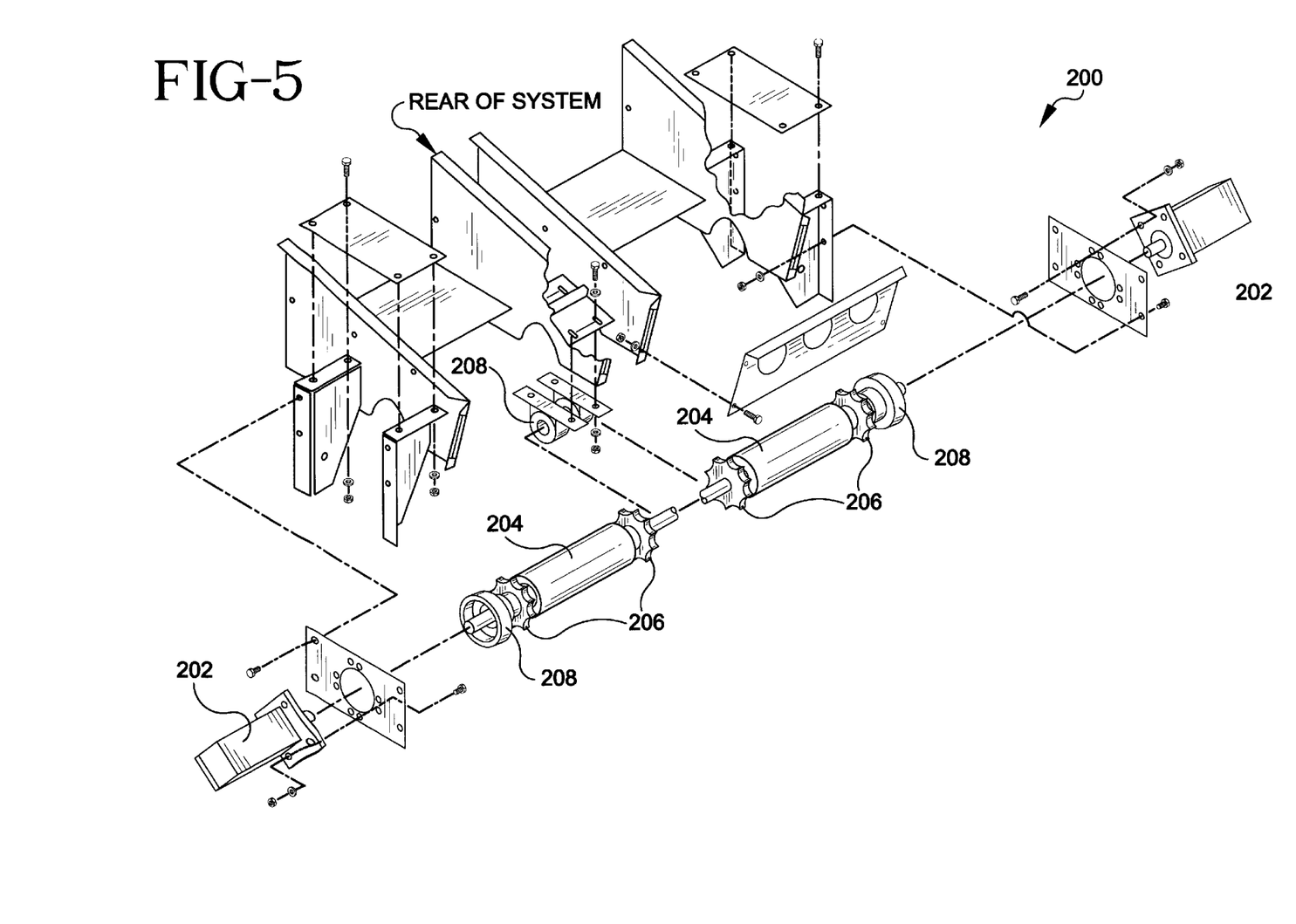
FIG. 5 illustrates a detailed view of a rear portion section of the combination conveyor belt/drive chain apparatus shown in FIG. 3.

FIG. 5 illustrates a detailed view of a rear chain drive apparatus 200 adapted for use with the combination conveyor belt/drive chain assembly 100 shown in FIG. 3. The rear chain drive apparatus 200 has a set of rollers 204 adapted to support a pair of product conveyor belts 101 to accommodate transport of lime, fertilizer, or combinations thereof from a set of storage bins to the spinner mechanisms. Preferably, a set of sprockets 206 have identical teeth pitch as the frontally mounted drive sprockets 302 and are set into a plurality of bearings 208 such that a set of variable speed drive motor assemblies 202 can selectively and variably control the speed and direction of the conveyor belts 101 and their associated drive chains 102.

Figure 6:
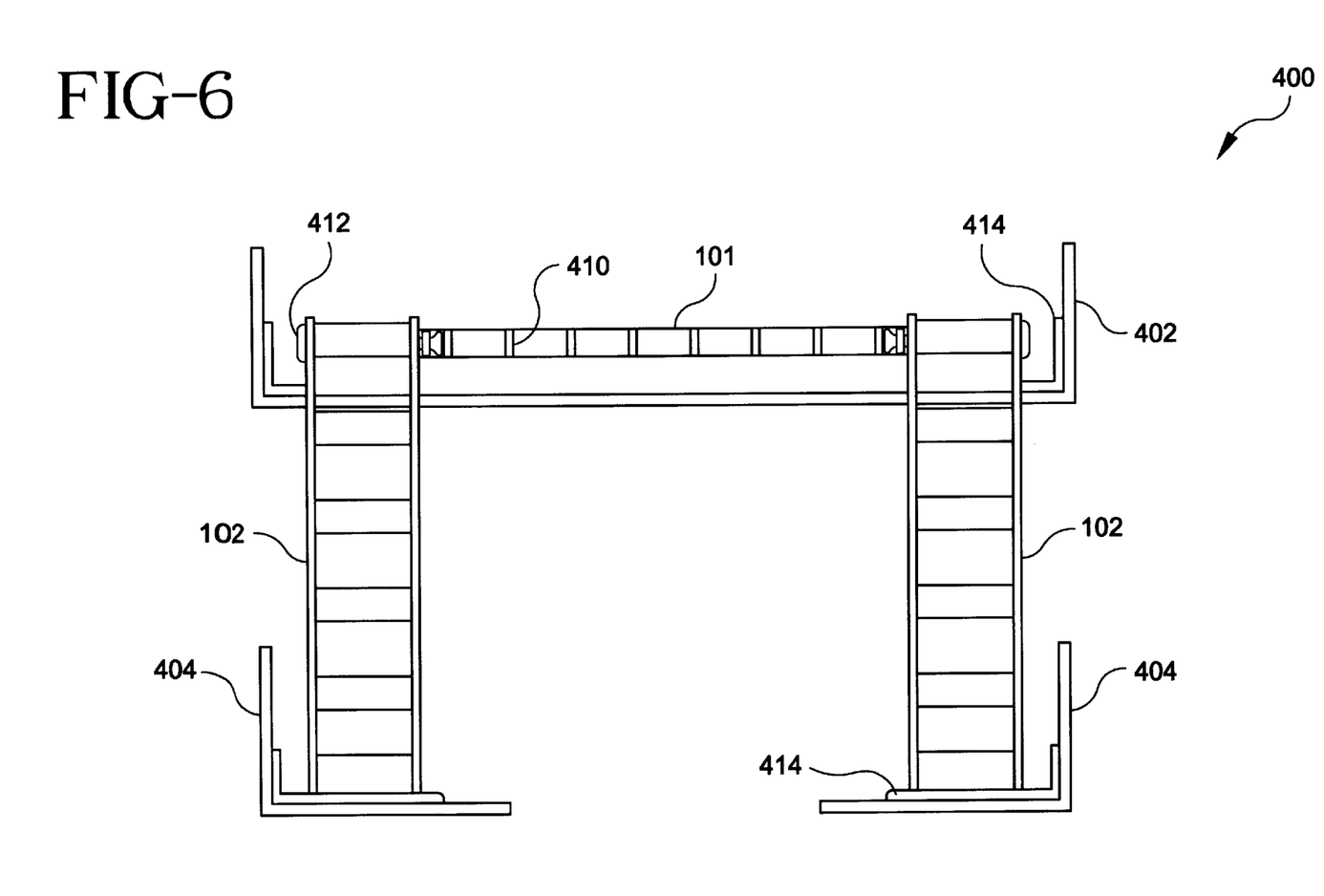
FIG. 6 illustrates an end elevation view for a portion of the combination conveyor belt/drive chain apparatus in accordance with one preferred embodiment of the present invention.

Moving now to FIG. 6, there is illustrated an end elevation view for a portion 400 of the combination conveyor belt/drive chain apparatus 100. The conveyor belt/drive chain apparatus 100 has an upper conveyor belt tray 402 for supporting the product transporting portion of the conveyor belt 101 and its attached roller bearing chains 102. The conveyor belt/drive chain apparatus 100 also has lower conveyor belt return support guides 404 as shown to support and carry the return portion of the conveyor belt 101 and its attached roller bearing chains 102. The present invention is not limited to the particular embodiment shown and the return support guides 404 could easily be replaced with a lower conveyor tray for example, or other structures that are also capable of providing the desired conveyor belt/chain 101, 102 support. It will readily be appreciated that the present invention will also work to provide the new and improved product application process provided the integrity of the product transporting portion of the conveyor belt 101 is maintained, e.g., belt slippage and drooping are reduced or eliminated. The present invention will also provide its intended functionality, even without lower return support guides 404 and the like. The upper conveyor belt tray 402 and the lower conveyor belt return support guides 404 preferably have an inner coating 414 comprised of a slippery durable material with a low coefficient of friction, e.g., Teflon®, epoxy or the like to allow the conveyor belts 101 to freely slide on. The inner coating 414 will increase the efficiency of the conveyor belt/drive chain apparatus 100 and help preserve the structural integrity of the conveyor belts 101 and associated drive chains 102. The conveyor belts 101 have a plurality of protrusions 410 on the outer surface as provided by the Chevron® belt. The drive chains 102 are adapted to allow use of rivets 412 to securely and rigidly couple the drive chains 102 to a desired portion of the protrusions 410. The efficiency of the conveyor belt/drive chain apparatus 100 is also enhanced using a chain lubrication assembly 500 as shown in FIG. 7.

Figure 7:
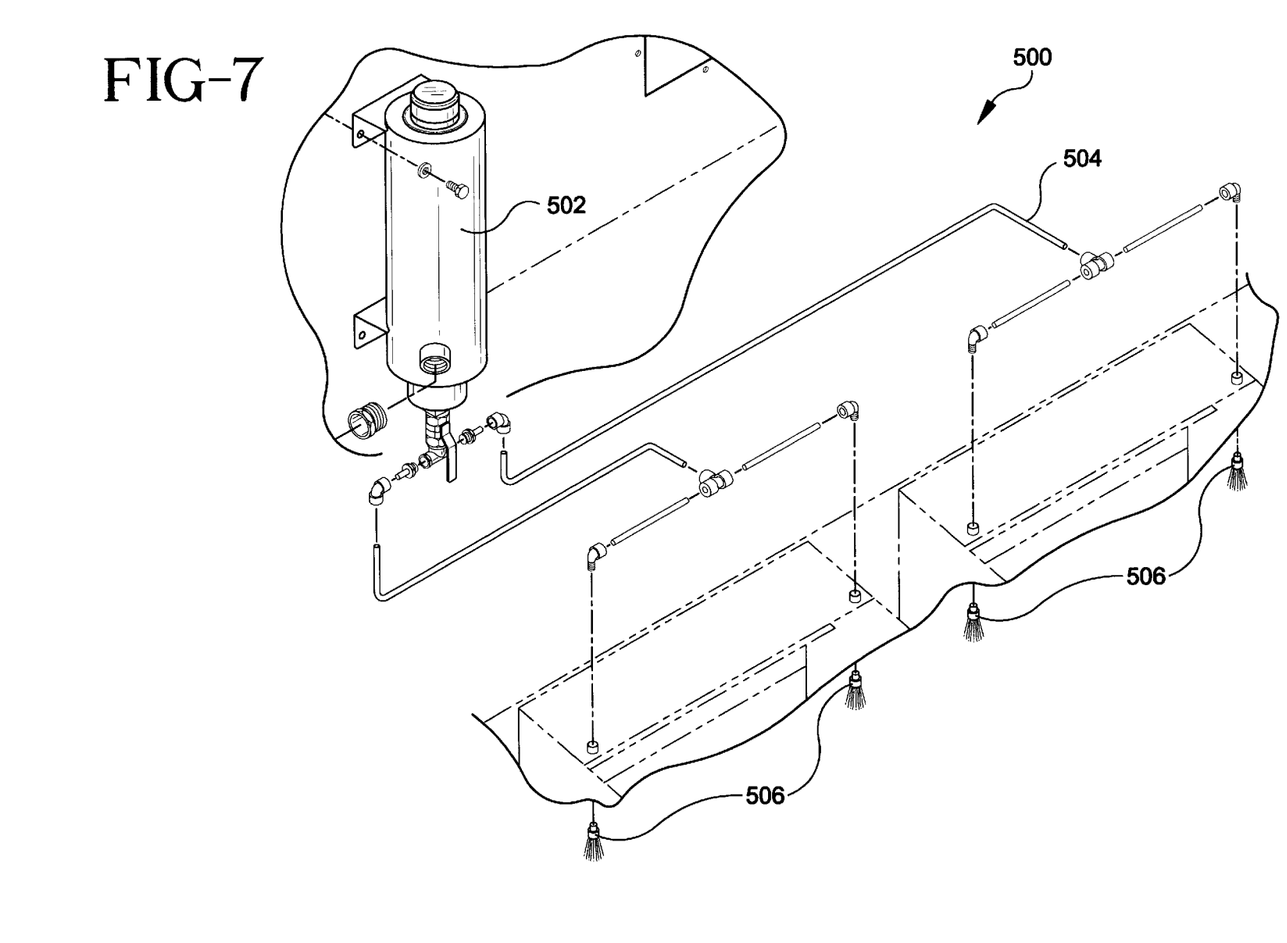
FIG. 7 illustrates one embodiment for a chain lubricating system suitable for use with the present combination conveyor belt/drive chain apparatus.

With reference to FIG. 7, one embodiment for a chain lubricating system 500 suitable for use with the present combination conveyor belt/drive chain apparatus 100 is illustrated. An oil reservoir 502 is hydraulically coupled via liquid lines 504 to a set of lubricating brushes 506 that are adapted to selectively brush a thin coating of oil over the drive chains 102 as the conveyor belts 101 transport product (s) to the spinner mechanism.

Figure 8:
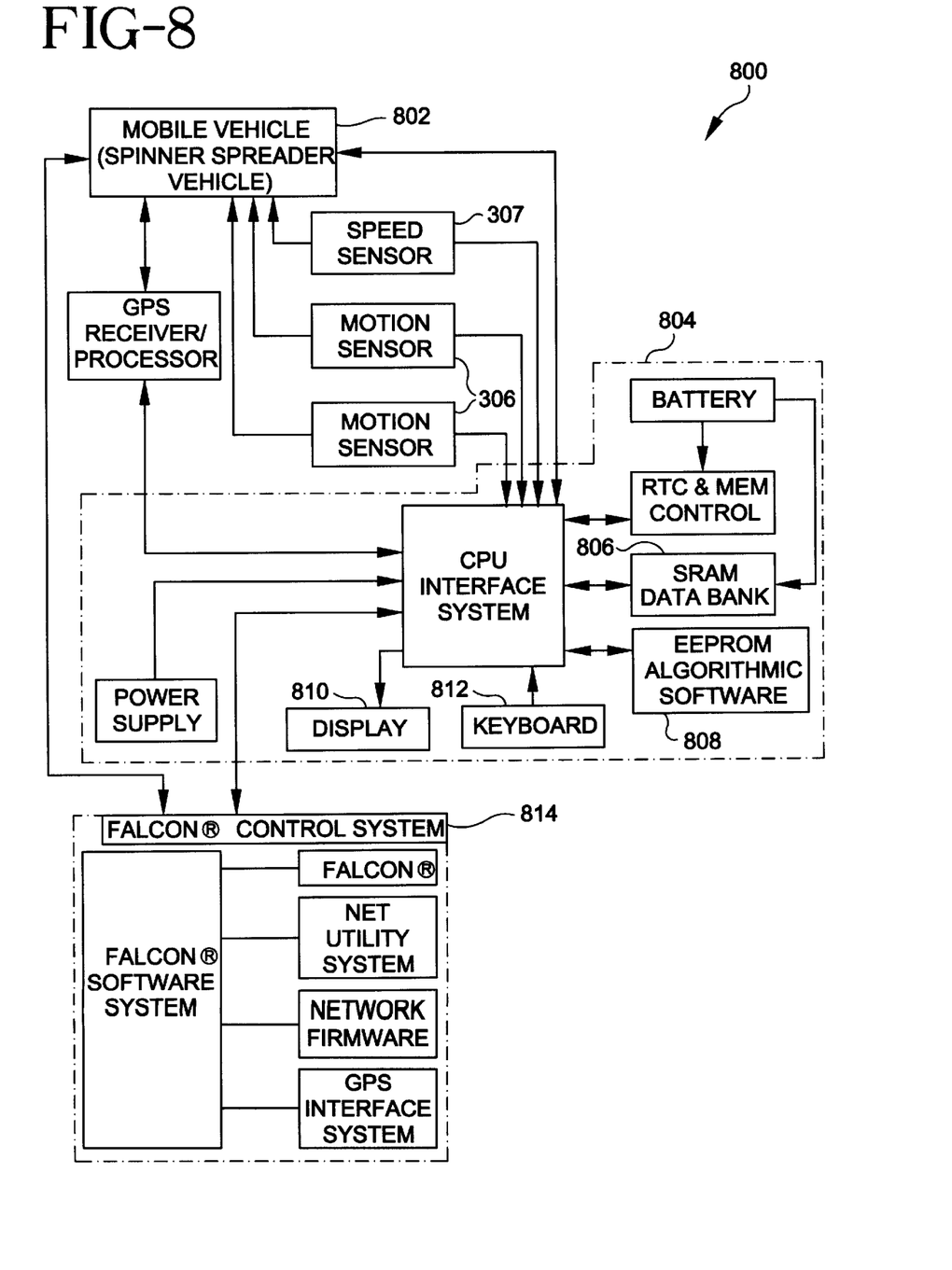
FIG. 8 illustrates a control system suitable for use with the present conveyor belt/drive chain apparatus to variably control the speed and direction of the apparatus and to selectively control a plurality of such conveyor belt/drive chain apparatus in conformance with one preferred embodiment of the present invention.

FIG. 8 illustrates a control system 800 suitable for use with the present conveyor belt/drive chain apparatus 100 which is used to variably control the speed and direction of the apparatus 100 and to selectively control a plurality of such conveyor belt/drive chain apparatus 100. Modern mobile product applicator machines are increasingly being adapted with various types of automated control systems. Generally, such automated control systems generally have a host controller located within the operator cab of the applicator machine. Typically, an associated input device such as a keyboard and an output devices such as a CRT monitor are also located within the operator cab. The host controller is commonly linked directly to at least one other controller located within the cab, and which is responsible for all communication to devices on the machine. U.S. Pat. No. 4,630,773, issued Dec. 23, 1986, to Ortlip, entitled, Method and Apparatus for Spreading Fertilizer, and U.S. Pat. No. RE 35,100, issued Nov. 28, 1995, to Monson et al., entitled, Variable Rate Application System, are both assigned to Ag-Chem Equipment Company, Inc. of Minnetonka, Minn. The system disclosed in the '100 reissue patent includes a controller accessing a soil map indicating a soil characteristic for each portion of the field. Field locations and status maps indicating current crop input level at various locations in a field to be treated are monitored by a control system. A crop input map is updated after a dispensing pass to provide a status record. Typical position locators for the machine in the field may include "Dead Reckoning," GPS, LORAN systems, and the like. U.S. Pat. No. 5,355,815 discloses another closed-loop variable rate applicator system. The system operates by determining a soil prescription in near real-time and dispenses crop inputs to the soil scene as a fraction of the soil prescription. The '815 patent is also assigned to Ag-Chem Equipment Company, Inc. Still another system is disclosed in U.S. Pat. No. 5,453,924, issued Sep. 26, 1995, to Monson et al., entitled, Mobile Control System Responsive To Land Area Maps. This system expands on earlier known applicator machine control systems, by incorporating a network which links a host controller positioned within the operator cab to multiple controllers located at various points on the machine external to the operator cab. It shall be understood that the control systems referenced herein describe systems which, when properly configured with suitable algorithmic software, can be easily adapted to monitor and control the speed and direction of the present inventive conveyor belt/drive chain apparatus 100.

With continued reference to FIG. 8, a block diagram illustrates one preferred embodiment of a product applicator control system 800 suitable for use with the present invention and includes a FALCON® controller 814, a spinner spreader machine 802, and a host computer system 804. The FALCON® controller 814 is manufactured by Ag-Chem Equipment Co., Inc. of Minnetonka, Minn. and can easily be adapted with the appropriate algorithmic software 808, motion sensors 306 and speed sensors 307 to sense, measure, report and adjust lime and fertilizer product application rates, on-the-go, in near real time, by way of various machine adjustments that include controlling the movement of the lime and fertilizer products via the present inventive conveyor belt/drive chain apparatus 100. The machine operator can optionally instruct the host computer system 804 (using keyboard 812 entry) to monitor and report (using display 810) stored target application rates such that the operator can manually instruct the computer system 804 to interface with appropriate sensors and controllers via an RS232 network or the like to adjust the conveyor belt/drive chain apparatus 100 motion and speed.

Having thus described the preferred embodiments in sufficient detail as to permit those of skill in the art to practice the present invention without undue experimentation, those of skill in the art will readily appreciate other useful embodiments within the scope of the claims hereto attached. For example, although the present invention has been described as useful for the lime and fertilizer product industries, those of skill in the art will readily understand and appreciate that the present invention has substantial use and provides many benefits in other industries as well. Some of these may include practicing the present invention to provide application of seeds, various chemicals, aggregate or any other certain constituents. In general, the agricultural community would find the present invention useful in selectively achieving accurate and efficient spreading for those products where purity standards must be maintained and product waste must be eliminated to preserve resources.

In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow.

I claim:

1. A spinner spreader machine comprising:
   a vehicle;
   at least one product storage bin associated with the vehicle;
   at least one spreader mechanism associated with the vehicle; and
   at least one conveyor belt assembly associated with the vehicle, the at least one conveyor belt assembly comprising:
   a conveyor belt defining an inner surface, a substantially continuous outer surface, a first side, a second side, an upper portion adapted to transport a product from the at least one product storage bin, and a lower return portion, the conveyor belt having a first and second drive chain operatively coupled to the first and second sides of the conveyor belt, the first and second drive chains each adapted to mesh with a first and second chain sprocket; and a conveyor tray adapted to support the upper portion of the conveyor belt;

wherein the upper portion of the conveyor belt is adapted to function in a substantially planar and continuous configuration as the conveyor belt transports product from at least one product storage bin to the at least one spreader mechanism.

2. The spinner spreader machine of claim 1 wherein the second chain sprocket has the same pitch as the first chain sprocket.

3. The spinner spreader machine of claim 1 wherein the at least one conveyor belt assembly further comprises at least one support roller positioned against the conveyor belt inner surface to define the conveyor belt upper portion and the conveyor belt lower return portion.

4. The spinner spreader machine of claim 3 wherein the at least one conveyor belt assembly further comprises at least one conveyor support member adapted to support the lower return portion of the conveyor belt such that the lower return portion of the conveyor belt remains substantially flat.

5. The spinner spreader machine of claim 4 further comprising at least one variable speed drive apparatus selectively coupled to the first chain sprocket and the second chain sprocket to variably control a speed and direction of movement of the conveyor belt.

6. The spinner spreader machine of claim 1 further comprising a plurality of protrusions on one or more portions of the outer surface of the conveyor belt.

7. The spinner spreader machine of claim 1 wherein the conveyor belt assembly is adapted to transport product in a substantially constant volumetric distribution over the outer surface of the conveyor belt.

8. A spinner spreader apparatus comprising:

a vehicle having storage means for storing at least one product;

at least one spinner apparatus attached to the vehicle; and at least one conveyor assembly associated with the vehicle, the at least one conveyor assembly comprising:

a substantially continuous and planar conveyor belt having an outer surface and further having a plurality of protrusions associated with the outer surface;

means for providing substantially slip-free motive force to the substantially continuous and planar conveyor belt such that product stored in the storage means is carried by the substantially continuous and planar conveyor belt to the at least one spinner apparatus; and supporting means for supporting selected portions of the substantially continuous and planar conveyor belt such that the product carried by the substantially continuous and planar conveyor belt has a substantially constant volumetric distribution over the outer surface.

9. The spinner spreader apparatus of claim 8 wherein the means for providing substantially slip-free motive force comprises at least one drive sprocket having a predetermined pitch.

10. The spinner spreader apparatus of claim 9 wherein the means for providing substantially slip-free motive force further comprises at least one drive chain coupled to the substantially continuous and planar conveyor belt wherein the at least one drive chain is adapted to mate with the at least one drive sprocket.

11. The spinner spreader apparatus of claim 10 wherein the substantially continuous and planar conveyor belt further comprises an inner surface, a first side portion and a second side portion, the at least one drive chain comprises a first drive chain coupled to at least one of the first side portion and the second side portion thereby defining a first driven side portion and an opposite side portion of the substantially continuous and planar conveyor belt.

12. The spinner spreader apparatus of claim 11 wherein the at least one drive chain further comprises a second drive chain selectively coupled to the opposite side portion of the substantially continuous and planar conveyor belt.

13. The spinner spreader apparatus of claim 12 wherein the at least one conveyor assembly further comprises means for segregating the substantially continuous and planar conveyor belt into an upper product carrying portion and a lower return portion.

14. The spinner spreader apparatus of claim 13 further comprising at least one variable speed drive apparatus selectively coupled to any one of the drive chains to variably control a speed and direction of movement of the substantially continuous and planar conveyor belt.

15. A spinner spreader machine comprising:

a vehicle;

at least one product storage device attached to the vehicle;

at least one spinner spreader apparatus attached to the vehicle;

a conveyor assembly attached to the vehicle, the conveyor assembly comprising:

a plurality of drive sprockets having a common predetermined pitch;

a plurality of substantially continuous conveyor belts, each conveyor belt configured with a smooth outer surface and further configured to mesh with the plurality of drive sprockets such that continuous rotation of the plurality of drive sprockets causes continuous movement of the plurality of conveyor belts and is adapted to carry products from the at least one product storage device to the at least one spinner spreader apparatus; and at least one support member configured to support selected portions of the substantially continuous conveyor belts, the substantially continuous conveyor belts adapted to transport products and adapted to provide a substantially planar configuration and consistent distribution of products.

16. The spinner spreader machine of claim 15 wherein each substantially continuous conveyor belt comprises an inner surface, a first side, a second side and a drive chain coupled to the first side, and each substantially continuous conveyor belt is configured to mesh with at least one of the drive sprockets via the drive chain.

17. The spinner spreader machine of claim 16 wherein the conveyor assembly further comprises at least one roller apparatus selectively positioned against the inner surface of each substantially continuous conveyor belt to define an upper portion and a lower return portion for each substantially continuous conveyor belt.

18. The spinner spreader machine of claim 17 further comprising at least one variable speed drive apparatus selectively coupled to the drive chains to variably control a speed and direction of movement of each substantially continuous conveyor belt.

* * * * *